United States Patent
Barajas Vargas et al.

(10) Patent No.: US 9,639,701 B1
(45) Date of Patent: May 2, 2017

(54) SCHEDULING DATA PROTECTION OPERATIONS BASED ON DATA ACTIVITY

(71) Applicant: EMC Corporation, Hopkinton, MA (US)

(72) Inventors: Ivan A. Barajas Vargas, Raleigh, NC (US); Kiko Nan Wang, Chengdu (CN); Pan Xiao, Chengdu (CN); Yang Zhang, Chengdu (CN); Clyde Xu Chen, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 14 days.

(21) Appl. No.: 14/674,438

(22) Filed: Mar. 31, 2015

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......... G06F 21/10; G06F 21/57; G06F 21/71; G06F 21/73; G06F 21/79; G06F 21/86
USPC .......................................................... 726/25
See application file for complete search history.

(56) References Cited

U.S. PATENT DOCUMENTS

| | | | | |
|---|---|---|---|---|
| 7,685,269 B1* | 3/2010 | Thrasher | ............... | G06F 9/4843 709/224 |
| 8,959,058 B1* | 2/2015 | Kleinschnitz | ....... | G06F 11/1461 707/644 |
| 9,319,758 B2* | 4/2016 | Goswami | ........... | H04Q 11/0067 707/634 |
| 2006/0253435 A1* | 11/2006 | Nishizawa | ........ | G06F 17/30433 707/E17.032 |
| 2007/0061180 A1* | 3/2007 | Offenberg | ........ | G06Q 10/06312 705/7.22 |
| 2007/0220321 A1* | 9/2007 | Iqbal | ................... | G06F 11/1469 714/13 |
| 2010/0017445 A1* | 1/2010 | Kobayashi | .......... | G06F 11/1466 707/E17.01 |
| 2010/0098407 A1* | 4/2010 | Goswami | ............. | H04B 10/032 398/5 |
| 2010/0281083 A1* | 11/2010 | Purtell, II | ......... | G06F 17/30082 707/822 |
| 2011/0153687 A1* | 6/2011 | Bacher | .............. | G06F 17/30312 707/812 |
| 2011/0202736 A1* | 8/2011 | Higashikado | ....... | G06F 11/1461 711/162 |
| 2012/0016839 A1* | 1/2012 | Yueh | ................... | G06F 11/1435 707/624 |
| 2012/0095935 A1* | 4/2012 | Mowat | ................... | G06Q 10/08 705/333 |
| 2015/0212741 A1* | 7/2015 | Lee | ....................... | G06F 3/0613 711/114 |

(Continued)

*Primary Examiner* — Haresh N Patel
(74) *Attorney, Agent, or Firm* — Krishnendu Gupta; Jason A. Reyes

(57) ABSTRACT

There is disclosed a method, a system, and a computer program product suitable for backing up data on a computer system. In at least one embodiment, the method comprises monitoring activity in connection with a plurality of data objects. The method also comprises determining a level of activity in connection with each data object. The method further comprises evaluating the level of activity in connection with each data object. The method still further comprises scheduling a data protection process in connection with at least one of the data objects based on the said evaluation.

14 Claims, 4 Drawing Sheets

(56) References Cited

U.S. PATENT DOCUMENTS

2015/0227602 A1* 8/2015 Ramu ............... G06F 17/30575
707/634

* cited by examiner

SCHEDULING DATA PROTECTION OPERATIONS BASED ON DATA ACTIVITY

TECHNICAL FIELD

The present invention relates generally to data protection. More specifically, the present invention relates to a method, system, and computer program product for scheduling data protection.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Storage is allocated for storing a primary set of user data. Additional storage may be used in connection with providing data protection for the primary set of data. Data protection may be provided by a data protection process used to facilitate obtaining copies of data, or portions thereof, at one or more points in time. The copy of data provides "protection" in that the copy may be used upon the occurrence of an event causing data failure, for example, when the primary or original data is destroyed, corrupted, or otherwise unavailable.

Unfortunately, data protection processes suffer from a number of problems. One such problem is the difficulty presented to users when setting an appropriate time interval for performing the process. For example, if the interval is too small, this may result in too much load being added and greater consumption of system resources. On the other hand, if the interval is too large, this may cause an inability to restore data from a particular time when needed.

There is, therefore, a need to address the above problem.

SUMMARY OF THE INVENTION

There is disclosed a method, comprising: monitoring activity in connection with a plurality of data objects; determining a level of activity in connection with each data object; evaluating the level of activity in connection with each data object; and based on the said evaluation, scheduling a data protection process in connection with at least one of the data objects.

There is also disclosed a system, comprising: at least one processing device, said at least one processing device comprising a processor coupled to a memory; wherein the system is configured to: monitor activity in connection with a plurality of data objects; determine a level of activity in connection with each data object; evaluate the level of activity in connection with each data object; and based on the said evaluation, schedule a data protection process in connection with at least one of the data objects.

There is further disclosed a computer readable medium having stored thereon computer executable instructions that when executed by a processor of a computer perform steps comprising: monitoring activity in connection with a plurality of data objects; determining a level of activity in connection with each data object; evaluating the level of activity in connection with each data object; and based on the said evaluation, scheduling a data protection process in connection with at least one of the data objects.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
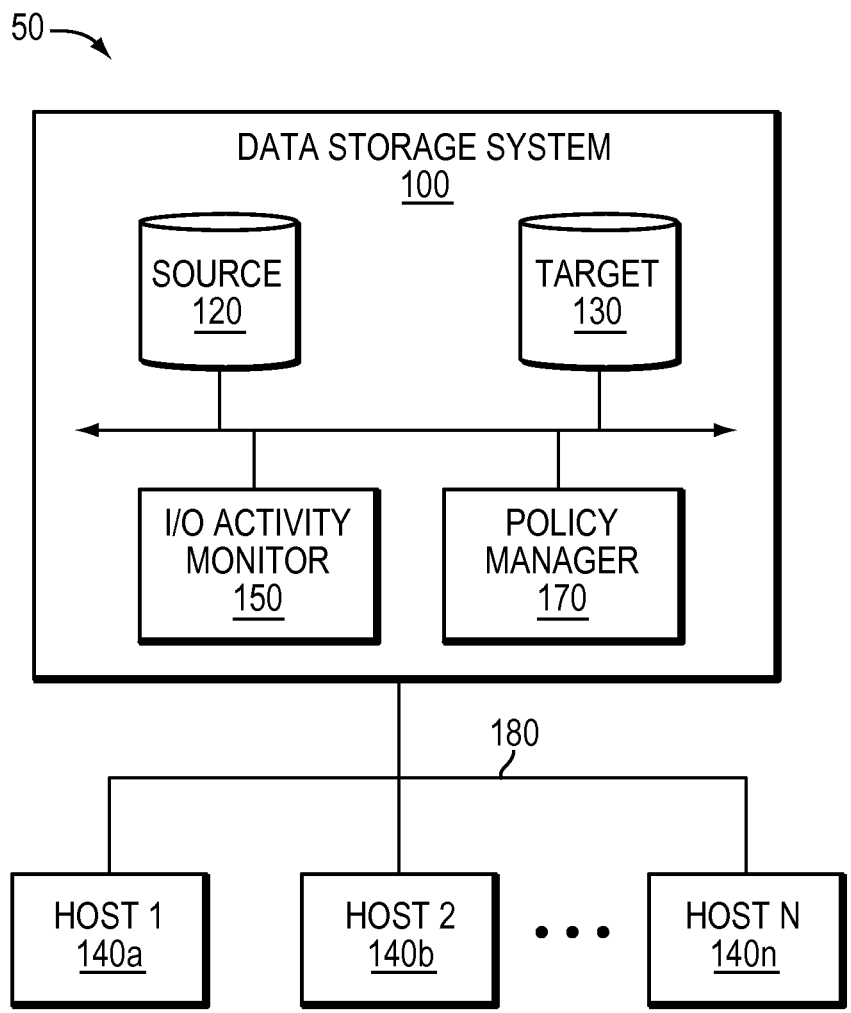
FIG. 1 is a block diagram of a system in accordance with an embodiment.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

Referring to FIG. 1, there is shown an example of an embodiment of a system that may be used in connection with performing the techniques described herein. The system 50 includes data storage system 100 connected to servers or host systems 140a-140n through communication medium 180. In this embodiment, the N servers or hosts 14a-14n may access storage in the data storage system 100. The communication medium 180 may be any one or more of a variety of networks or other type of communication connections as known to those skilled in the art.

Data storage system 100 comprises source 120 and target devices 130 configured in a manner that enables the target 130 to protect data stored on source 120. For example, the source 120 may store one or more storage objects, such as a file, a directory, a virtual or logical storage device, etc. Data protection may be provided by performing a data protection process using any one or more different data protection methods to provide copies of data, or portions thereof, by copying data from source 120, such as data of a storage object, to target 130. Different data protection methods in which the original data may be copied may use different technologies in providing the data protection. For example, an embodiment using the techniques herein may use data protection methods including one or more methods for providing full backup, incremental backup, differential backup, replication backup, such as through mirroring or point in time copy of data, tape-based backup, disk-based backup, snapshots, continuous data protection schemes, and the like.

Additionally, as can be seen from the figure, data storage system 100 also comprises an IO activity monitor 150 for monitoring user access in connection with data objects stored on source 120. For example, the data objects may be files organized in a file system. The IO activity monitor 150 observes the IO activity in connection with these files and maintains a table describing the write and read operations in connection with the files.

Data storage system 100 further comprises a policy manager 170 for managing and implementing a data protection schedule and retention policy. The policy may specify different parameters including parameters in connection with the frequency or how often the data protection process is performed. For example, the parameters may specify how often to take a snapshot of a data object based on monitored user access in connection with the data object. Additionally, different parameters may be specified including how long to retain a data snapshot or other form of data obtained using a data protection process. For example, the policy may specify that data obtained in connection with snapshots are retained for 1 week, 10 days, 30 days, and the like. Thus, each log file or other information obtained at different points in time by the data protection process may be retained for an amount of time in accordance with the policy. Aspects of the data protection schedule and/or retention policy may vary with system requirements, state and/or federal compliance, and the like.

In use, the system 100 as described herein is configured to automatically set different data protection frequencies for an individual file based on a file usage model. It should be understood that a file that is accessed more frequently is regarded as a more important file than a less accessed file and should be subjected to a data protection process more frequently even if the file is not the most modified file. Take the following example, a file with 1 modification and 50 accesses per day, and a file with 5 modifications and 1 access per day, in this example the file with 50 accesses is considered to be more important on this particular day and should be subjected to a data protection process more frequently (e.g., snapshot, backup, etc.). For the least accessed files, the data protection process is performed less frequently.

For example, a user may choose to backup all files under partition D. The user usage of the files in this partition is then monitored. In response to the modification, it is noticed that the files under folder 'Document' and 'Log' are frequently accessed while files under folder 'Installation' are barely accessed. It may then be decided that files under folder 'Document' and 'Log' should be more frequently backed up and files under 'Installation' should be backed up with a larger time interval. A week later, the user may find that files under folder 'Document' and 'Log' may have more than 100 of point-in-time copies and files under 'Installation' only have 10 point-in-time copies.

It should be understood that the approach as described herein can be extremely useful in scenarios in which the user can't distinguish easily at the beginning what is the most important file. For example, if there were hundreds of financial statements, it is difficult to estimate which financial statement files will be accessed a lot. The approach described herein deals with this scenario by monitoring access in connection with the financial statement files and scheduling accordingly.

By implementing the approach, the user does not need to worry about setting data protection frequency. The system 100 described herein tracks file usage and sets the frequency intelligently. It ensures that important files will be protected frequently so users have enough opportunities to go back to a specific point-in-time copy. It also helps to save system resources by setting sparse point-in-time copies of less important files.

Figure 2:
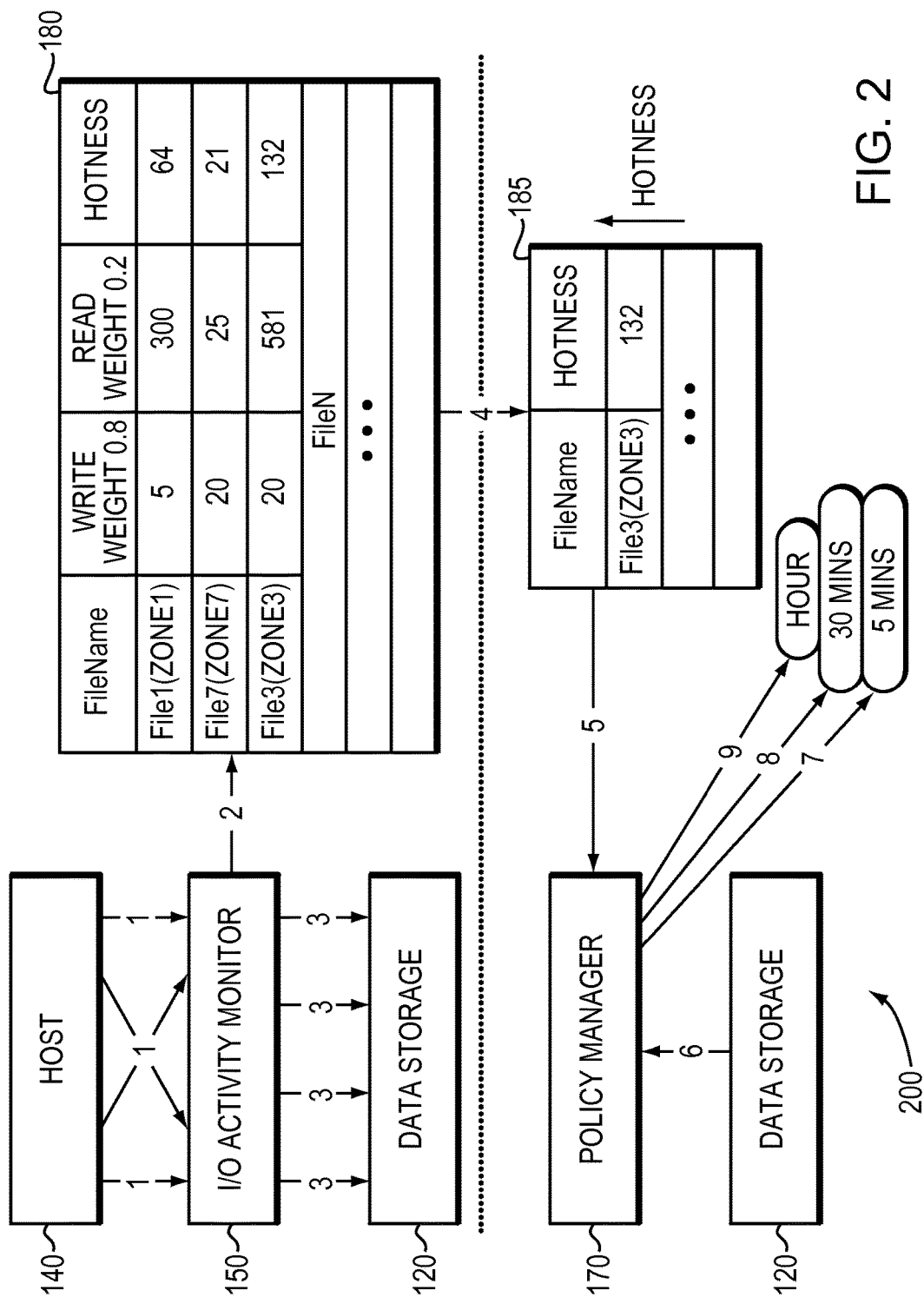
FIG. 2 is a diagram illustrating the system of FIG. 1 in operation in accordance with an embodiment.

Referring to FIG. 2, there is illustrated a diagram showing an example of the system of FIG. 1 in operation in accordance with an embodiment. As illustrated, host 140 communicates with the data storage system by way of an I/O operation such as a write or read operation (step 1). Activity monitor 150 monitors the I/O activity between the host and the data storage system enabling a table 180 to be created that describes the amount of writes and reads and the hotness of files (step 2). The I/O operation as received from the host is processed by accessing data storage (step 3). Upon generation of the table 180, the table 180 is evaluated with a view to selecting a pre-determined amount of frequently accessed files. For example, the top ten percent of the files that correspond to the most frequently accessed files may be selected. A second table 185 is then generated that includes the selected files (step 4). Following generation of the table 185, the policy manager 170 may access the table 185 (step 5) in order to identify the files in the table. After identifying the files, the policy manager obtains data corresponding to the files from data storage (step 6). The policy manger 170 then sets a schedule specifying a frequency for performing a data protection process in connection with the files in the table 185 and implements the data protection process in accordance with the schedule (steps 7 to 9). It should be understood that the default schedule for performing the data protection process may be low (e.g. daily). As a result, the policy manger 170 may set the schedule higher for the files in the table 185. For example, every 5 minutes, every 30 minutes, every 60 minutes, and the like.

In this particular embodiment, the hotness of the files may be determined in step 2 by applying respective weights to the monitored number of write and read operations. For example, a weight of 0.8 may be applied to the total monitored number of writes and a weight of 0.2 applied to the total monitored number of reads. The weighted totals may then be aggregated. It should, therefore, be understood that the hotness of a file may be determined as follows:

Hotness=(# of writes*0.8)+(# of reads*0.2)

For example, File 'A' Data "abcd" may have been changed 10 times in 30 minutes, and the final result is "cdba", and during the same period this data may have been read another 350 times. In such an example, the hotness may be determined as follows:

Hotness=(10*0.8)+(350*0.2)=78

As a result, the frequency may be changed to every 5 minutes such that a data protection process is performed every 5 minutes. This way the intermediate changes between "abcd" and "'cdba" are less likely to be missed compared to a case in which the process is performed just every 30 minutes or hourly. The advantage of the above approach to determining hotness is that it takes into account read accesses. If the read accesses were not considered above the hotness value would be much smaller resulting in the data protection process being performed less frequently. This may result in some or all of the above changes being missed.

Figure 3:
FIG. 3 is a diagram of an exemplary policy in accordance with an embodiment.

Referring to FIG. 3, there is illustrated a diagram of an exemplary policy 300 in accordance with an embodiment. In this particular embodiment, the policy indicates that if the hotness score for a file is below 25 then the data protection process is performed every hour. The policy also indicates that if the hotness score for a file is between 25 and 75 then the data protection process is performed every 30 minutes. Further, the policy indicates that if the hotness score for a file is above 75 then the data protection process is performed every 5 minutes.

Figure 4:
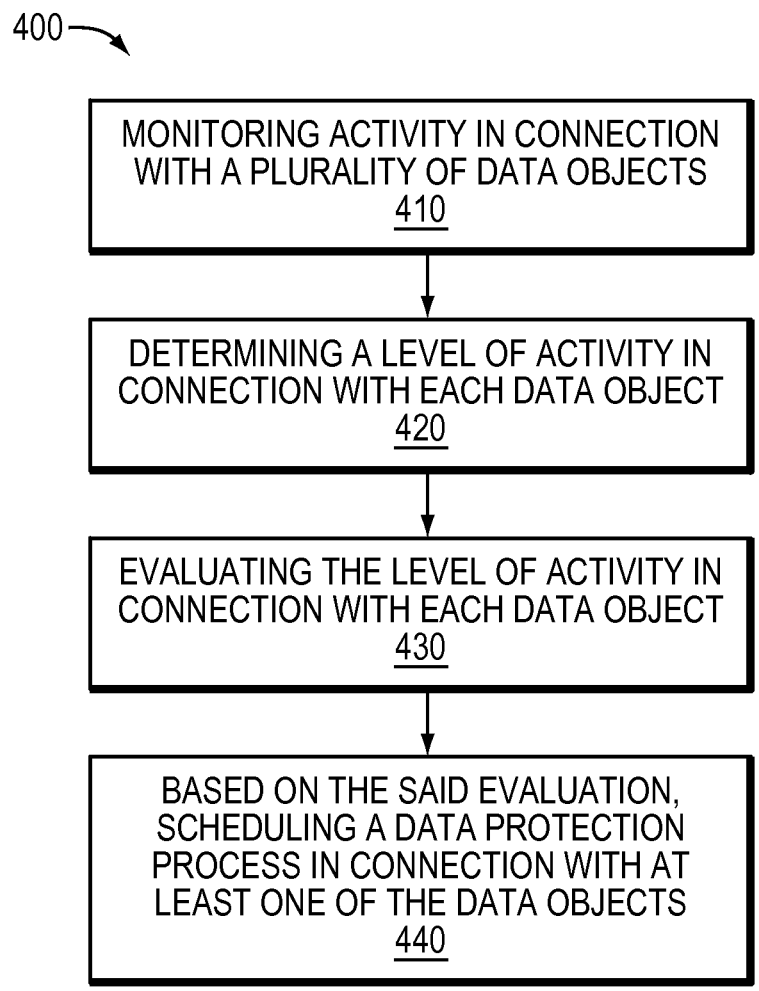
FIG. 4 is a flow chart illustrating a method in accordance with an embodiment.

Referring to FIG. 4, there is illustrated a flow chart illustrating a method 400 in accordance with an embodiment. In the flow diagram, the operations are summarized in individual blocks. The operations may be performed in hardware, or as processor-executable instructions that may be executed by a processor. Furthermore, the method 400 may, but need not necessarily, be implemented in the system 100 of FIG. 1.

At step 410, the method monitors activity in connection with a plurality of data objects. For example, the data objects may be files arranged in a file system. As described herein, such monitoring comprises monitoring Input/Output (I/O) activity in connection with each data object. It also comprises maintaining a table describing the I/O activity in connection with each data object.

At step 420, the method determines a level of activity in connection with each data object. The level of activity (or activity level) is represented by an activity value calculated for each data object that is based on the number of write and read operations in connection with the respective data objects. It should be understood that the write and read operations have respective weights associated therewith. The weight associated with the write operations being greater than the weight associated with the read operations. Calculating the activity value comprises applying the respective weights to the associated number of write and read operations in connection with the data object. The weighted number of write and read operations is then aggregated to calculate the activity value that is in a format that enables ranking of the data objects.

At step 430, the method evaluates the level of activity in connection with each data object. The evaluation comprising ranking the data objects based on their respective levels of activity. It should be understood that in this embodiment a data object with a high level of activity is ranked higher than a data object with a low level of activity. The evaluation then involves selecting at least one data object based on the said ranking. The said selecting of the at least one data object comprises choosing the highest ranked data object. Alternatively, the said selecting of the at least one data object comprises choosing a pre-determined amount of ranked data objects whereby the chosen data objects correspond to the highest ranked data objects in the ranking of data objects. For example, the pre-determined amount may represent a percentage of high ranked data objects.

At step 440, the method schedules a data protection process in connection with at least one of the data objects based on the said evaluation. For example, the data protection process may relate to a backup or a snapshot, and the data protection process may be scheduled to be performed in connection with a first data object periodically based on the evaluation of the first data object. Thus, it should be understood that the scheduling comprises determining a rate of occurrence such that data protection process is performed at a first point-in-time and a second point-in-time. The first and second points-in-time shall have a defined interval therebetween. Subsequently, the method may create a first replica at the first point-in-time. Further, the method may create a second replica at the second point-in-time.

It will be understood that various details of the subject matter described herein may be changed without departing from the scope of the subject matter described herein. Furthermore, the foregoing description is for the purpose of illustration only, and not for the purpose of limitation.

What is claimed is:
1. A method, comprising:
monitoring activity in connection with data object;

determining a level of activity in connection with the data object;

evaluating the level of activity in connection with the data object; and based on the said evaluation, scheduling data protection operations in connection with the data object, wherein the scheduling comprises determining a rate of occurrence relating to the performance of the data protection operations; and wherein determining a level of activity in connection with the data object, comprises:

determining a number of write and read operations in connection with the data object;

applying respective weights to the number of write and read operations, wherein a first weight is applied to the number of write operations and a second weight different to the first weight is applied to the number of read operations; and based on weighted number of write and read operations, producing an activity value that describes the level of activity in connection with the data object.

2. The method as claimed in claim 1, wherein monitoring the activity comprises monitoring Input/Output (I/O) activity in connection with the data object.

3. The method as claimed in claim 1, where monitoring the activity comprises maintaining a table describing Input/Output (I/O) activity in connection with the data object.

4. The method as claimed in claim 1, wherein the weight associated with the write operations is greater than the weight associated with the read operations.

5. The method as claimed in claim 1, wherein the determined level of activity is in a format that enables ranking of the data object; and wherein evaluating the level of activity in connection with the data object comprises:

ranking the data object based on the level of activity, wherein a data object with a high level of activity is ranked higher than a data object with a low level of activity; and selecting the data object based on the said ranking.

6. The method as claimed in claim 5, wherein the said selecting of the data object comprises choosing the highest ranked data object.

7. The method as claimed in claim 5, wherein the said selecting of the data object comprises choosing a predetermined amount of ranked data objects including the data object, the chosen data objects corresponding to the highest ranked data objects in the ranking of data objects.

8. The method as claimed in claim 1, wherein a plurality of replicas are scheduled to be created in connection with the data object; and wherein scheduling data protection operations in connection with the data object comprises:

determining the rate of occurrence such that a first replica is to be created at a first point-in-time and a second replica is to be created at a second point-in-time, the first and second points-in-time having a defined interval therebetween.

9. The method as claimed in claim 8, further comprising:

creating the first replica at the first point-in-time; and creating the second replica at the second point-in-time.

10. The method as claimed in claim 1, wherein the data object comprise a file organized in a file system.

11. The method as claimed in claim 1, wherein the data protection operations relate to a point-in-time snapshot.

12. The method as claimed in claim 1, wherein the data protection operations relate to a backup.

13. A system, comprising:

memory; and processing circuitry coupled to the memory, the memory storing instructions which, when executed by the processing circuitry, cause the processing circuitry to:

monitor activity in connection with data object;

determine a level of activity in connection with the data object;

evaluate the level of activity in connection with the data object; and based on the said evaluation, schedule data protection operations in connection with the data object, wherein the scheduling comprises determining a rate of occurrence relating to the performance of the data protection operations; and wherein determining a level of activity in connection with the data object, comprises:

determining a number of write and read operations in connection with the data object;

applying respective weights to the number of write and read operations, wherein a first weight is applied to the number of write operations and a second weight different to the first weight is applied to the number of read operations; and based on the weighted number of write and read operations, producing an activity value that describes the level of activity in connection with the data object.

14. A non-transitory computer readable medium having stored thereon computer executable instructions that when executed by processing circuitry cause the processing circuitry to perform steps comprising:

monitoring activity in connection with a data object;

determining a level of activity in connection with the data object;

evaluating the level of activity in connection with the data object; and based on the said evaluation, scheduling data protection operations in connection with the data object, wherein the scheduling comprises determining a rate of occurrence relating to the performance of the data protection operations; and wherein determining a level of activity in connection with the data object, comprises:

determining a number of write and read operations in connection with the data object;

applying respective weights to the number of write and read operations, wherein a first weight is applied to the number of write operations and a second weight different to the first weight is applied to the number of read operations; and based on the weighted number of write and read operation, producing an activity value that describes the level of activity in connection with the data object.

\* \* \* \* \*